United States Patent [19]

McCord et al.

[11] 4,001,031

[45] Jan. 4, 1977

[54] PROCESS FOR MAKING LOW ALKALI CEMENT CLINKER

[75] Inventors: Andrew T. McCord, Snyder; Louis E. Wagner, Elma; Theodore J. Reese, Snyder, all of N.Y.

[73] Assignee: Chem-Trol Pollution Services, Inc., Model City, N.Y.

[22] Filed: Apr. 7, 1975

[21] Appl. No.: 565,663

Related U.S. Application Data

[63] Continuation-in-part of Ser. No. 416,458, Nov. 16, 1973, abandoned, which is a continuation-in-part of Ser. No. 311,898, Dec. 4, 1972, abandoned.

[52] U.S. Cl. .................................. 106/100; 106/103
[51] Int. Cl.$^2$ ........................................... C04B 7/02
[58] Field of Search ........................... 106/100, 103

[56] References Cited

UNITED STATES PATENTS

| | | | |
|---|---|---|---|
| 1,124,238 | 1/1915 | Brown | 106/100 |
| 1,186,522 | 6/1916 | Ellis | 106/100 |
| 1,209,135 | 12/1916 | Eckel et al. | 106/100 |
| 1,411,518 | 4/1922 | Rhodes et al. | 106/100 |
| 2,792,312 | 5/1957 | Geary et al. | 106/100 |
| 3,589,920 | 6/1971 | Ostberg et al. | 106/100 |

*Primary Examiner*—J. Poer
*Attorney, Agent, or Firm*—Bean & Bean

[57] ABSTRACT

The potential $K_2O$ content of cement clinker due to the presence of potassium compounds in the raw feed mix is substantially eliminated by introducing an active agent into the kiln along with or in conjunction with the fuel used to fire the kiln. The active agent is effective to convert $K_2O$ to KCl and preferably is a chlorinated organic waste product burned along with the fuel.

6 Claims, No Drawings

PROCESS FOR MAKING LOW ALKALI CEMENT CLINKER

CROSS REFERENCE TO RELATED APPLICATION

This application is a continuation of application Ser. No. 416,458, filed Nov. 16, 1973, now abandoned, and which is a continuation-in-part of abandoned application Ser. No. 311,898, filed Dec. 4, 1972, now abandoned.

BACKGROUND OF THE INVENTION

In the manufacture of Portland cement, a factor which has assumed greater importance in recent years is the control of alkali content in the cement clinker. As is conventional in the art, what is meant by alkali herein is either $Na_2O$ or $K_2O$. The presence of alkali in the cement clinker can result in what is known as the alkali-aggregate reaction, an effect which causes excessive expansive action of the concrete and serious weakening of the structure involved.

Various techniques have been used to obtain low total alkali content of the clinker which may be classed as follows:
1. Raw material control.
    a. The use of raw materials which are themselves of low alkali content.
    b. Leaching soluble alkali salts from the raw materials themselves.
2. Flue dust recycle control.
    a. Discarding the flue dust.
    b. Leaching out soluble alkali salts from the flue dust prior to recycling it to the raw mix.
3. Process parameter modification
    a. Increasing the temperature of the burning process.
    b. Increasing the time period of the burning process.
    c. Modifying the cooling process.
4. Raw mix additives.

An effective agent which has been found is $CaCl_2.2H_2O$ although to be effective its use can be costly. Probably the most effective agents currently in use are those containing hydrochloric acid. i.e. certain pickling liquors. When calcium chloride dihydrate is used it is added to the raw feed mix which, as is conventional, may be in dry or in slurry form. Likewise, hydrochloric acid when used is also added to the raw feed.

Conventionally, the mix progresses to the hotter regions of the kiln where the organic matter burns away and the carbonates lose carbon dioxide, a portion of the sulfates also is decomposed, liberating $SO_3$, and chloride and alkali salts are partially volitalized. It is principally in this region of the kiln, before a portion of the mass is converted to liquid, where alkali loss is effected. It should be noted, in this respect, that even without the addition to the raw feed mix of material calculated specifically to reduce alkali content, one may expect on the average a loss of about 53% of the $K_2O$ and 19% of the $Na_2O$ incidental to the burning process, reaching final values typically less than 1% of the clinker.

Significant reduction in alkali content by the use of raw feed mix additives requires an economically significant amount of the additive even though the percentage amount of additive in the raw feed mix is low. This latter fact creates an additional problem in that the additive, to be effective must be very uniformly dispersed throughout the mix and adequate control is difficult to achieve.

Nevertheless, the use of additives to reduce alkali content of the clinker is widely practiced if for no other reason than to meet the ASTM standards for cement.

BRIEF SUMMARY OF INVENTION

The present invention relates to the discovery that the alkali content of cement clinker may be significantly and surprisingly reduced by introducing controlled amounts of an active agent into the kiln together or in conjunction with the fuel utilized to supply the kiln with the necessary heat. Preferably, the active agent is a liquid chlorinated organic waste product in which case the active agent utilized may be diluted with a liquid non-chlorinated waste product so that the mixture itself is a fuel having significant heat value which allows reduction in the amount of conventional fuel used. However, the active agent need not be in liquid form nor does it have to be an organic material. Solid, liquid or gaseous active agents may be employed so long as they are capable of being broken up, dispersed or otherwise swept along through the kiln incidental to the combustion process so that the raw feed mix as it is being converted to clinker is maximally and as uniformly as possible contacted so that substantially all of the potassium content of the raw feed mix is volatilized as KCl.

The invention may be practised by the addition of the active agent to the fuel either in direct admixture therewith or as introduced in controlled quantities with respect to the introduction of fuel, either alone, or in conjunction with conventional additives introduced into the raw feed mix.

DETAILED DESCRIPTION OF THE INVENTION

Although the exact mechanism involved according to the present invention is not fully understood, it appears that the introduction of the active agent in conjunction with the fuel not only creates a condition in which the aforesaid uniformity of action occurs but also may allow different mechanisms to occur within different regions of the kiln, all to the end that less additive appears to be necessary according to this invention to obtain significant reduction in alkali content of cement clinker as compared with the amount of feed mix additives required to achieve a corresponding reduction in alkali content of the clinker. A more uniform effectiveness of the active agent appears to result in connection with the present invention and this factor alone appears to contribute to the efficiency of the process.

Various factors should be taken into consideration in selecting the particular active agent used in connection with this invention, among which availability, cost and relative usefullness for other purposes are the chief factors. One very significant advantage of this invention is that many materials which otherwise are waste products whose disposal creates a problem may be used advantageously. Thus, various waste products from chemical processes may be used and many of them will represent readily available material with which to practise the invention. However, the active agents herein are not limited to such by-products for it is in general expeditious to utilize any active agent so long as it does not contain material which would be detrimental to the cement making process or would create enviromental pollution attendant upon its combustion, or would more usefully be employed for another purpose. By "active agent" as used herein is meant any material which when introduced with or in conjunction with the fuel for firing the kiln is effective ultimately to convert the potassium content of the raw feed mix to KCl.

In general, however, a great many chlorinated organic waste products will be available for use among which may be noted various saturated, unsaturated, aromatic, cyclic, heterocyclic or polymeric chlorinated compounds such as carbon tetrachloride and hexachloroethane; trichloroethylene and vinyl chloride; monochlorobenzene and para-chlorotoluene; chlorocyclohexane and 3,3 dichloro- 1,2 dimethylcyclopropane; 3,5 dichoropyridine and 2,6,8 trichloropurine; polyvinyl chloride and chlorinated polyethylene, as well as chlorinated pesticides such as lindane and the DDT family. The above are representative only.

Because many such chlorinated organic waste products are liquids, their use in admixture with and in controlled amounts in association with fuel oil as conventionally utilized to fire the kilns of cement plants allows a very precise control of the active agent addition according to the present invention.

Gaseous as well as solid materials may also be used, however, and the advantages of this invention may be most pronounced when a useable waste product is at hand which itself presents a disposal problem. For example, disposable PVC containers are in widespread usage for many different products and when discarded may present a disposal problem. Such materials may readily be salvaged for use according to this invention.

If desired, conventional alkali content-reducing raw feed mix material additives may be employed in minor amount to achieve alkali content reduction in the conventional way while further and enhanced alkali content reduction is achieved in the hot regions of the kiln by the active agent concept according to the present invention.

EXAMPLE I

In a conventional calcining kiln for producing cement clinker, the raw feed mix is a slurry including limestone, feldspar, iron oxide, alumina, and silica fed into the upper end of the inclined kiln. At the lower end of the kiln fuel oil and chlorinated liquid organic waste in conjunction therewith is fed at a rate sufficient to produce the heat necessary to calcine and to fuse the raw feed mix and produce cement clinker which is discharged at the lower end of the kiln. In the Example herein, the kiln was about 500 feet long and the fuel is No. 6 oil preheated to about 160° F introduced into the kiln at a rate of about 2000 gal/hr. The active agent is a mixture of 93% (by volume) of a by-product from the manufacture of chlorotoluenes and 7% of a by-product from the manufacture of carbon tetrachloride, the mixture containing approximately 40% equivalent chlorine, trace free acidity of HCl, trace free water and trace amount of free chlorine, and is introduced by a separate nozzle with the fuel at the rate of about 80 gal/hr. Specifically, the by-product of the manufacture of chlorotoluenes containes about 99% of chlorotoluene with minor amounts of meta-chlorotoluene and para-chlorotoluene, while the by-product of the manufacture of carbon tetrachloride contains about 94% carbon tetrachloride, about 4% chloroform and about 2% of a mixture of chlorinates including trichloroethylene, perchlorethylene, ethylene dichloride, tetrachloroethane, pentachloroethane and hexachloroethane. This example represents one mode of practising the invention wherein the active agent contributes but a small precentage of the BTU required to make the cement clinker.

Analysis of typical Portland cements which may be obtained according to Example I are as follows:

|  | Type I | Type II | Type III | Type IV | White |
|---|---|---|---|---|---|
| Loss on Ignition | 1.3% | 0.8% | 1.2% | 0.9% | 0.9% |
| $SiO_2$ | 21.3 | 22.3 | 20.4 | 24.3 | 25.0 |
| $Al_2O_3$ | 6.0 | 4.7 | 5.9 | 4.3 | 3.4 |
| $Fe_2O_3$ | 2.7 | 4.3 | 3.1 | 4.1 | 2.8 |
| CaO | 63.2 | 63.1 | 64.3 | 62.3 | 64.1 |
| MgO | 2.9 | 2.5 | 2.0 | 1.8 | 1.9 |
| $SO_3$ | 1.8 | 1.7 | 2.3 | 1.9 | 1.0 |
| $K_2O$ | — | — | — | — | — |

EXAMPLE II

In this example, the same conditions are present as set forth above in Example I except that the active agent is diluted to a chlorine content of about 2% by mixing the active agent with a non-chlorinated waste product having a BTU content per gallon essentially the same as the 6 fuel oil.

To obtain the same rate of heat input and of equivalent chlorine introduction into the kiln as in Example I, the fuel oil flow rate is reduced to about 500 gallons/hour while the rate of diluted active agent is about 1600 gallons/hour, the specific BTU content of the active agent plus diluent being about equal to that of the fuel oil. Thus, significant reduction in fuel oil consumption is realized. At the same time, the increased flow rate of active agent source allows a more precise control of the introduction of equivalent chlorine into the system.

As noted above, various chlorinated organic waste products may be used and, as diluents as in Example II, various waste products having high heat content may be employed.

Large quantities of chlorinated organic wastes are generated in the production of chlorinated organic compounds and, if left untreated, constitute pollutants contaminating and endangering the natural resources of our environment. Morover, these chlorinated organic wastes can be hazardous to animal and human life. Also, the finished products formed or chlorinated organics, which are widely distributed for industrial, agricultural and domestic use, frequently are not completely consumed or destroyed during their usage and remain stable to further contribute to environmental pollution. Accordingly, the disposition and management of these chlorinated organic wastes are serious problems in the field of environmental control.

The chlorinated organic wastes are generated either from the operations involved in the production of chlorinated organic compounds or from the finished products themselves after they have served their useful function, or from contaminated or rejected finished products.

For example, in the production of desired chlorinated organic products, certain side reactions occur which yield unwanted chlorinated compounds considered to be wastes. Frequenctly, multiple reactions are conducted in an effort to obtain the desired product, each of these reactions resulting in wastes containing chlorinated materials, the chlorine content often being significantly large.

Also, significant amounts of chlorinated organic wastes are generated from the chlorinated organic finished products used in domestic, industrial and agricultural applications. For example, specific industrial wastes include the many chlorinated solvents used for the cleaning and degreasing of metal parts and the chlorinated liquids employed in power transformers and capacitors. Domestic and agricultural chlorinated organic wastes include weed killers, pesticides and the like which have not been entirely consumed, have become spoiled or contaminated, or have been banned from use by law.

However, many other active agents may be used as, for example, chlorine gas, calcium chloride, silicon tetrachloride, etc.

An important consideration in connection with this invention is that the active agent is introduced into the kiln along with or in conjunction with the main fuel source for firing the kiln. In this way, the active agent is immediately acted upon by the intense heat of the flame, is well dispersed or distributed throughout the cross section of the kiln and is swept along with the combustion gases. In this way, the active agent comes into contact with the feed material throughout the kiln and will also maximally contact the feed material in the preheaters as conventionally employed. This is in direct contrast to the use of raw feed mix additives. For example, when calcium chloride is used as a feed additive, the following reaction:

$$CaCl_2 + K_2O \rightarrow CaO + 2 KCl$$

does not occur until the temperature of the material exceeds about 1800° F. Similarly, when spent pickling liquor containing HCl is used as the raw feed mix the HCl first reacts with the limestone to form $CaCl_2$ and the aforesaid reaction thereof with $K_2O$ does not occur until the temperature exceeds about 1800° F.

With the present invention, a uniformly distributed formation of $CaCl_2$ may take place in the cooler regions of the kiln or in the preheater when a chlorinated organic waste is used due to reaction of HCl with limestone, but conversion of $K_2O$ to KCl is not restricted to this particular procedure because of the essentially continuous contacts between the active agent and the material throughout the kiln. When materials such as calcium chloride are employed as the active agent herein, their uniform distribution and the sweeping thereof through the kiln also assures, as before, an efficient and uniform action upon the raw feed mix before and as it is being converted to the cement clinker.

What is claimed is:
1. The method of making cement clinker, which comprises the steps of:
   a. forming a raw feed mix which when calcined will produce cement clinker having an unacceptable high value of $K_2O$ alkalinity;
   b. continuously introducing the raw feed mix of step (a) into one end of a kiln while recovering cement clinker from the other end of the kiln;
   c. firing the kiln with a fuel at a rate sufficient to produce the cement clinker; and
   d. controlling the $K_2O$ alkalinity of the recovered clinker by incorporating a chlorinated organic liquid fuel as part of the fuel employed to fire the kiln in step (c), said organic liquid fuel being incorporated in amount sufficient significantly to reduce the $K_2O$ alkalinity of the recovered clinker.
2. The method as defined in claim 1 wherein the chlorinated organic fuel of step (d) is a waste product containing o-chloro toluene.
3. The method as defined in claim 1 wherein the chlorinated organic fuel of step (d) is a waste product containing a mixture by volume of 93% o-chloro toluene and 7% carbon tetrachloride.
4. The method as defined in claim 1 including the step of adding a chlorine-containing compound to the raw feed mix of step (a) in amount sufficient to reduce the $K_2O$ alkalinity of the recovered clinker.
5. The method as defined in claim 2 including the step of adding a chlorine-containing compound to the raw feed mix of step (a) in amount sufficient to reduce the $K_2O$ alkalinity of the recovered clinker.
6. The method as defined in claim 3 including the step of adding a chlorine-containing compound to the raw feed mix of step (a) in amount sufficient to reduce the $K_2O$ alkalinity of the recovered clinker.

* * * * *